(12) United States Patent
Nakashima et al.

(10) Patent No.: US 6,416,853 B1
(45) Date of Patent: *Jul. 9, 2002

(54) COLOR-CHANGE LAMINATES AND TOY SETS WITH THE USE THEREOF

(75) Inventors: Akio Nakashima; Masahiro Ito; Yoshiaki Ono, all of Aichi (JP)

(73) Assignee: The Pilot Ink Co., Ltd., Aichi (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,168

(22) Filed: Jan. 7, 1999

(30) Foreign Application Priority Data

Jan. 9, 1998 (JP) ............................................ 10-014952
Jan. 30, 1998 (JP) ............................................ 10-034168

(51) Int. Cl.$^7$ ............................. B32B 3/26; B32B 5/16; B32B 5/18

(52) U.S. Cl. ................... 428/313.9; 428/29; 428/317.1; 428/317.9; 428/331; 442/77; 503/201; 503/206

(58) Field of Search ............................... 428/29, 317.9, 428/331, 199, 313.9, 317.1; 442/74, 77, 59; 503/201, 206

(56) References Cited

U.S. PATENT DOCUMENTS

| | | | | |
|---|---|---|---|---|
| 3,928,541 A | * | 12/1975 | Wason | 423/339 |
| 4,681,791 A | * | 7/1987 | Shibahashi | 428/96 |
| 4,810,562 A | * | 3/1989 | Okawa | 428/199 |
| 5,084,309 A | * | 1/1992 | Smith et al. | 428/29 |
| 5,219,625 A | * | 6/1993 | Matsunami | 428/30 |
| 5,688,592 A | * | 11/1997 | Shilbahashi | 428/323 |
| 6,228,804 B1 | * | 5/2001 | Nakashima | 503/226 |

* cited by examiner

*Primary Examiner*—Terrel Morris
*Assistant Examiner*—Ula C. Ruddock
(74) *Attorney, Agent, or Firm*—Sughrue Mion, PLLC

(57) ABSTRACT

A color-change laminate comprising a substrate and formed thereon a porous layer which comprises a low-refractive-index pigment dispersed in a binder resin and tenaciously adherent thereto is disclosed. The porous layer becomes transparent or translucent upon absorption of a liquid medium, e.g., water to give a variety of visual changes. The low-refractive-index pigment contains at least a finely particulate silicic acid produced by the wet process. Toy sets consisting of the above color-change laminates with dolls or toy animals and toy sets consisting of the above color-change laminates with a means of water adhesion are also provided.

7 Claims, 3 Drawing Sheets

COLOR-CHANGE LAMINATES AND TOY SETS WITH THE USE THEREOF

BACKGROUND OF THE INVENTION

The present invention relates to color-change laminates and toy sets with the use of the same. More particularly, it relates to color-change laminates which can undergo a variety of changes not seen in the ordinary state upon absorption of a liquid, e.g., water and can recover the original state upon completion of drying and toy sets with the use of the same.

BACKGROUND OF THE INVENTION

Converted papers and sheets are known which comprise a substrate and formed thereon a porous layer containing a low-refractive-index pigment and which, upon liquid absorption, becomes transparent and develops the color tone of the underlying layer (see JP-B-50-5097, U.S. Pat. No. 4,810,562; the term "JP-B" as used herein means an "examined Japanese patent publication").

In these converted papers and sheets, the underlying layer is shielded by the porous layer in a dry (absorption of no liquid) and, upon liquid absorption, the porous layer becomes transparent and thus the color tone of the underlying layer is perceived. When the hiding properties of the porous layer are improved, the transparency upon liquid absorption is deteriorated. When the low-refractive-index pigment is added only in a reduced amount to enhance the transparency upon liquid absorption, on the contrary, there arises another problem that the hiding properties in a dry state are deteriorated. When the underlying layer has a color tone with a relatively high lightness (for example, a fluorescent color tone), the low-refractive-index pigment should be added in an increased amount to shield the color tone. As a result, the transparency upon liquid absorption is lowered and thus the vivid color can be hardly perceived.

On the other hand, JP-A-1-260075 proposes moisture-sensitive color-changing printing agents containing finely particulate silicic acid and brilliant pearl pigments to be printed on various substrates (the term "JP-A" as used herein means an "unexamined published Japanese patent application"). In a dry state, these moisture-sensitive color-changing printing agents show a white color attributable to the finely particulate silicic acid. Upon moistening, the finely particulate silicic acid becomes transparent and the color tones of the brilliant pearl pigments are perceived. However, these color tones attributable to the brilliant pearl pigments are less vivid compared with the color tones of common dyes or pigments. In addition, these printing agents have a disadvantage that the color tones of the substrates are restricted to black or dark colors so as to sufficiently perceive the color tones of the brilliant pearl pigments.

SUMMARY OF THE INVENTION

An object of the present invention is to overcome the problems encountering in the conventional laminates having porous layers. Namely, the present invention aims at providing color-change laminates which can establish both of the hiding properties in a dry state and the transparency upon liquid absorption and can be used in applications in various fields including toys, ornaments and designs, and toy sets with the use of the same.

DETAILED DESCRIPTION OF THE INVENTION

Figure 1:
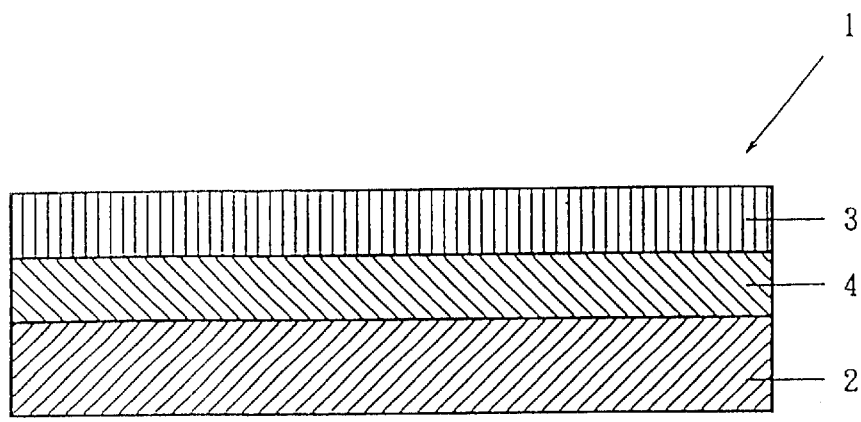
FIG. 1 is a vertical sectional view illustrating one embodiment of the color-change laminates of the present invention.

The present invention provides a color-change laminate comprising a substrate and formed thereon a porous layer which comprises a low-refractive-index pigment dispersed in a binder resin and tenaciously adherent thereto, characterized in that said porous layer becomes transparent or translucent upon liquid absorption to give a variety of visual changes and said low-refractive-index pigment contains at least a finely particulate silicic acid produced by the wet process. Furthermore, the present invention is characterized in that the finely particulate silicic acid has a molecular structure containing two-dimensional structure parts; that the porous layer contains from 1 to 30 $g/m^2$ of the low-refractive-index pigment; that a non-color-changing layer containing a fluorescent colorant is provided under said porous layer; that the binder resin is at least a urethane resin; that the substrate is a cloth; and that a reversibly thermochromic layer is further provided. Moreover, the present invention provides a toy set consisting of the above-mentioned color-change laminate with a doll or a toy animal or a toy set consisting of the above-mentioned color-change laminate with a means of water adhesion.

The porous layer containing the low-refractive-index pigment exhibits hiding properties in the ordinary (i.e., dry) state and has a white color. Upon absorption of a liquid medium, e.g., water, it becomes transparent or translucent and thus develops the color tone of the underlying layer.

As the low-refractive-index pigment, use is commonly made of, for example, finely particulate silicic acids, a barite powder, precipitated barium sulfate, barium carbonate, precipitated calcium carbonate, gypsum, clay, talc, alumna white, and basic magnesium carbonate having refractive indexes in the range of from 1.4 to 1.7. The present inventors have conducted extensive studies to satisfy both hiding properties in the ordinary state and transparency after liquid absorption. As a result, they have found out that the above requirements can be both satisfied by using a finely particulate silicic acid produced by the wet process (hereinafter referred to as "wet-process finely particulate silicic acid").

The above-mentioned finely particulate silicic acids are produced as noncrystalline amorphous silicic acid, and are roughly classified depending on production process into two groups: the silicic acid produced by the dry process based on a vapor-phase reaction such as the pyrolysis of a silicon halide, e.g., silicon tetrachloride (hereinafter referred to as "dry-process finely particulate silicic acid"); and that produced by the wet process based on a liquid-phase reaction such as the decomposition of, e.g., sodium silicate with an acid. As described above, wet-process finely particulate silicic acid is most desirable as the finely particulate silicic acid to be used for satisfying the hiding properties in the ordinary state and transparency after liquid absorption. This is because dry-process finely particulate silicic acid differs in structure from wet-process finely particulate silicic acid. Specifically, dry-process finely particulate silicic acid has a three-dimensional structure constituted of densely linked silicic acid molecules as shown in the following formula:

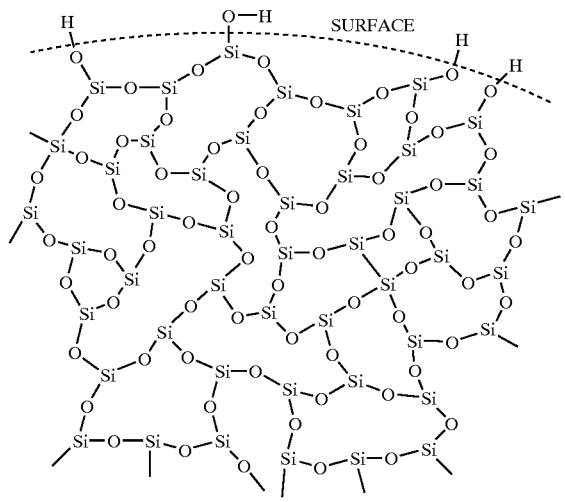

On the other hand, wet-process finely particulate silicic acid has two-dimensional structure parts each constituted of a long arrangement of molecular units formed by the condensation of silicic acid. The molecular structure of wet-process finely particulate silicic acid is hence coarser than that of dry-process finely particulate silicic acid. It is therefore presumed that a porous layer containing wet-process finely particulate silicic acid is excellent in irregular light reflection in a dry state and hence has enhanced hiding properties in the ordinary state, as compared with a system containing dry-process finely particulate silicic acid.

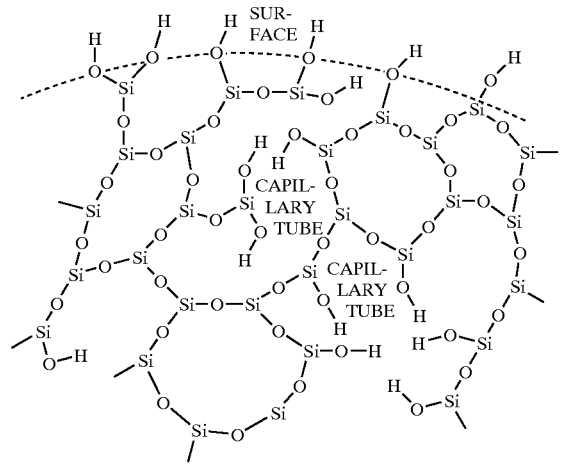

The low-refractive-index pigment contained in the porous layer desirably has moderate hydrophilicity because the medium which penetrates into the layer is mainly water. In this point, wet-process finely particulate silicic acid is preferred because it has a larger amount of hydroxyl groups present as silanol groups on the particle surface and is hence more hydrophilic than dry process finely particulate silicic acid.

To regulate the hiding properties of the porous layer in the ordinary state and its transparency after liquid absorption, it is also possible to use the above-mentioned low-refractive-index pigment together with the wet-process finely particulate silicic acid.

When wet-process finely particulate silicic acid is used in the above porous layer, the application amount thereof is preferably from 1 to 30 $g/m^2$, more preferably from 5 to 20 $g/m^2$, from the standpoint of satisfying both hiding properties in the ordinary state and transparency after liquid absorption, although it varies depending on the properties of the wet-process finely particulate silicic acid, e.g., the particle diameter, specific surface area, and oil absorption thereof. If the amount thereof is smaller than 1 $g/m^2$, it is difficult to obtain sufficient hiding properties in the ordinary state. If the amount thereof exceeds 30 $g/m^2$, on the other hand, it is difficult to obtain sufficient transparency after liquid absorption.

The particle size of the finely particulate silicic acid is desirably from 0.03 to 10.0 $\mu$m, though the present invention is not restricted thereto.

The above-mentioned low-refractive-index pigment is dispersed into a vehicle containing a binder resin, and the dispersion is applied and then dried to remove the volatile ingredient to thereby form a porous layer.

Examples of the binder resin include urethane resins, nylon resins, vinyl acetate resins, acrylic ester resins, acrylic ester copolymer resins, acrylic polyol resins, vinyl chloride/vinyl acetate copolymer resins, maleic acid resins, polyester resins, styrene resins, styrene copolymer resins, polyethylene resins, polycarbonate resins, styrene/butadiene copolymer resins, acrylonitrile/butadiene copolymer resins, methyl methacrylate/butadiene copolymer resins, butadiene resins, chloroprene resins, melamine resins, emulsions of the resins enumerated above, casein, starch, cellulose derivatives, poly (vinyl alcohol), urea resins, phenolic resins and epoxy resins.

The mixing ratio of the above-mentioned finely particulate silicic acid to the binder resin varies depending on the type and properties of the finely particulate silicic acid. It is desirable to use 0.5 to 2 parts by weight (on solid basis), still preferably from 0.8 to 1.5 parts by weight, of the binder resin per part by weight of finely particulate silicic acid. When the amount of the binder resin is smaller than 0.5 part by weight (on solid basis) per part by weight of finely particulate silicic acid, it is difficult to establish a practically usable film strength of the porous layer. When the amount of the binder resin exceeds 2 parts by weight, the penetration of water into the porous layer is worsened.

As compared with conventionally known general coating films, the porous layer described above has a smaller binder resin proportion to the pigment and is hence less apt to have sufficient film strength. Consequently, for use in applications where washing resistance and abrasion resistance are required, it is preferred to use a urethane resin as the binder or as a part of the binder.

When dry-process finely particulate silicic acid, a barite powder, precipitated barium sulfate, barium carbonate, precipitated calcium carbonate, gypsum, clay, talc, alumna white, basic magnesium carbonate, etc. are employed as the low-refractive-index pigment, the film strength can be enhanced by using a urethane resin as the binder resin or at least as a part of the binder resin.

Examples of the above-mentioned urethane resin include polyester urethane resins, polycarbonate urethane resins, and polyether urethane resins. A combination of two or mote of such urethane resins may be used. It is also possible to use either a urethane emulsion resin which is an aqueous emulsion of any of the above resins or a colloidal dispersion type (ionomer type) urethane resin obtained by causing a urethane resin having ionicity (urethane ionomer) to dissolve or disperse in water by means of self-emulsion based on its ionic groups without the aid of any emulsifying agent.

The urethane resin may be either a water-based one or an oil-based one. However, a water-based urethane resin, in particular, a urethane emulsion or colloidal dispersion type urethane resin, is preferably used in the present invention.

Although the urethane resin can be used alone, it may be used in combination with one or more other-binder resins according to the kind of the substrate and the performances required of the film. In the case where a combination of the urethane resin with other resin(s) is used, the content of the urethane resin is preferably regulated to at least 30% by weight on solid basis based on all binder resins in the porous layer in order to obtain film strength sufficient for practical use.

As the above-mentioned binder resin, a nylon resin may be appropriately employed similar to a urethane resin.

When a crosslinkable binder resin is used, the film strength can be further improved by adding any desired crosslinking agent to crosslink the resin.

The binder resins enumerated above vary in affinity for water. By using a suitable combination of two or more of these, it is possible to regulate the time required for water to penetrate-into the porous layer, the degree of penetration, and the rate of drying after penetration. It is also possible to control the-above regulation by suitably adding a dispersant.

It is also possible to achieve various color changes of the porous layer by adding thereto conventionally known metalescent pigments, e.g., mica-coated with titanium dioxide, mica coated with iron oxide/titanium dioxide, mica coated with iron oxide, guanine, sericite, basic lead carbonate, acidic lead arsenate, or bismuth oxychloride, general dyes or pigments, fluorescent dyes or pigments, etc.

Further, it is possible to add a reversibly thermochromic material showing reversible color charges upon temperature change or to provide a reversibly thermochromic layer containing a reversibly thermochromic material.

Examples of the reversibly thermochromic material used for forming the reversibly thermochromic layer include reversibly thermochromic compositions each containing three ingredients consisting of an electron-donating color-developing organic compound, an electron-accepting compound, and an organic compound medium which reversibly causes the color reaction between the two compounds, and further include liquid crystals, $Ag_2HgI_4$ and $Cu_2HgI_4$.

Specific examples of the reversibly thermochromic compositions containing the three ingredients consisting of an electron-donating color-developing organic compound, an electron-accepting compound, and an organic compound medium which reversibly causes the color reaction are given in U.S. Pat. Nos. 4,028,118, 4,732,810 and 5,558,700. Such a material changes its color at a given temperature (point of color change) and, in the ordinary temperature range, is present only in a specific one of the two states shown respectively before and after the color change. Although the other state is maintained as long as the heat or cold necessary to this state is kept being applied, the material returns, upon removal of the heat or cold, to the state shown in the ordinary temperature range. Namely, this material is of the type which changes its color while showing a small hysteresis width ($\Delta H$) with respect to the temperature-color density relationship with changing temperature.

Also effective are the thermochromic color-memory compositions proposed in U.S. Pat. Nos. 4,720,301 and 5,558,699 by the present applicant, which change their colors while showing a wide hysteresis width. Specifically, these thermochromic compositions are of the type in which the curve obtained by plotting the change in color density with changing temperature differs considerably in shape between the case in which the temperature is elevated from the lower-temperature side of the color change temperature range and the reverse case in which the temperature is lowered from the higher-temperature side of the color change temperature range. These compositions are reversibly thermochromic materials characterized in that they can memorize and retain their state experienced at temperatures not higher than the lower-temperature-side point of color change or not lower than the higher-temperature-side point of color change, after they have returned to the ordinary temperature range between the lower-temperature-side point of color change and the higher-temperature-side point of color change.

Although the above-described reversibly thermochromic composition containing the three ingredients consisting of an electron-donating color-developing organic compound, an electron-accepting compound, and an organic compound medium which reversibly causes the color reaction can be effectively used as it is, the composition is preferably used after having been microencapsulated. This is because the microencapsulated reversibly thermochromic composition can retain the same composing ratio and produce the same effect under various use conditions.

By the microencapsulation, a chemically and physically stable pigment can be constituted. Microcapsules suitable for practical use have a particle diameter of generally from 0.1 to 100 $\mu$m, preferably from 1 to 50 $\mu$m, more preferably from 2 to 30 $\mu$m.

For the microencapsulation, conventionally known techniques may be used, such as, e.g., the interfacial polymerization method, in-situ polymerization method, coating method in which curing is conducted in a liquid, phase separation from an aqueous solution, phase separation from an organic solvent, fusion dispersion cooling method, coating method in which a suspension in air is used, and spray drying method. A suitable method may be selected from these according to uses. Prior to practical use, the microcapsules may be coated with a secondary resin film to impart durability thereto or modify the surface properties thereof.

The reversibly thermochromic composition (preferably microencapsulated pigment) may be dispersed in a vehicle containing a resin which is a film-forming material and applied as a coloring material, e.g., an ink or a coating, to form a reversibly thermochromic layer. It is also possible to disperse the reversibly thermochromic in a thermoplastic resin or a thermosetting rein and mold into a sheet, etc. to give a substrate which itself has a reversibly thermochromic properties.

It is also possible to achieve various color changes by adding to the reversibly thermochromic layer general dyes or pigments, fluorescent dyes or pigments, etc.

The resin contained in the vehicle is preferably a transparent film-forming resin, examples of which are as follows.

Examples of the binder resin include ionomer resins, isobutylene/maleic anhydride copolymer resins, acrylonitrile/acrylic styrene copolymer resins, acrylonitrile/styrene copolymer resins, acrylonitrile/butadiene/styrene copolymer resins, acrylonitrile/chlorinated polyethylene/styrene copolymer resins, ethylene/vinyl chloride copolymer resins, ethylene/vinyl acetate copolymer resins, ethylene/vinyl acetate/vinyl chloride graft copolymer resins, vinylidene chloride resins, vinyl chloride resins, chlorinated vinyl chloride resins, vinyl chloride/vinylidene chloride copolymer resins, chlorinated polyethylene resins, chlorinated polypropylene resins, polyamide resins, high-density polyethylene resins, medium-density polyethylene resins, linear low-density polyethylene resins, poly(ethylene terephthalate) resins, poly(butylene terephthalate) resins, polycarbonate resins, polystyrene resins, high-impact polystyrene resins, polypropylene resins, poly(methylstyrene) resins, poly(acrylic ester) resins, poly(methyl methacrylate) resins, epoxy acrylate resins, alkylphenol resins, rosin-modified phenolic resins, rosin-modified alkyd resins, phenol-modified alkyd resins epoxy-modified alkyd resins, styrene-modified alkyd resins, acrylic-modified alkyd resins, aminoalkyd resins, vinyl chloride/vinyl acetate resins, styrene/butadiene resins, epoxy resins, unsaturated polyester resins, polyurethane resins, vinyl acetate emulsion resins, styrene/butadiene emulsion resins, acrylic ester emulsion resins, water-soluble alkyd resins, water-soluble melamine resins, water-soluble urea resins, water-soluble phenolic resins, water-soluble epoxy resins, water-soluble polybutadiene resins, cellulose acetate, cellulose nitrate and ethyl cellulose.

Examples of the above-mentioned substrate include clothes such as woven fabrics, knit fabrics, braiding, and nonwoven fabrics, papers, synthetic papers, artificial leathers, leathers, rubbers, plastics, glasses, ceramics, woods and stones. All of these are effective.

Moreover, materials with poor water resistance, e.g., woodfree quality paper, art paper, coated paper, etc. can be employed as the substrate by laminating film(s) thereon, applying a resin thereto, impregnating the same with a resin, etc.

When clothes are used as the substrate, it is preferred to use woven fabrics having highly smooth surface from the standpoint of the porous layer film-formation as described above. When the surface of the cloth is coarse or an ink, etc. largely penetrates into the cloth to thereby worsen the film-forming properties of the porous layer, the film-forming properties can be improved by, for example, making the cloth water-repellent.

The above-mentioned porous layer and reversibly thermochromic layer can be formed by conventionally known methods such as, e.g., printing techniques including screen printing, offset printing, gravure printing, printing with a coater, tampon (tympan) printing, and transfer printing and coating techniques including brushing, spray coating, electrostatic coating, electrodeposition, flow coating, roller coating and dip coating.

If desired, the color-change laminate of the present invention may be further provided with a non-color-changing layer formed by applying a non-color-changing ink containing a general dye or pigment or a fluorescent dye or pigment. It is also possible to form a metalescent layer by applying an ink containing a metalescent pigment, e.g., mica-coated with titanium dioxide, mica coated with iron oxide/titanium dioxide, mica coated with iron oxide, guanine, sericite, basic lead carbonate, acidic lead arsenate, or bismuth oxychloride.

In the present invention, in particular, a fluorescent color with a relatively high lightness can be shielded even though a non-color-changing layer containing a fluorescent dye or a fluorescent pigment is provided under the porous layer, thus giving a color-change laminate with a widened degree of freedom of changes in color in the ordinary state and after absorbing a liquid.

A protective layer or a light stabilizer layer may be suitably formed. Specifically, the light stabilizer layer is a layer containing, dispersed and tenaciously adherent therein, a light stabilizer selected from ultraviolet absorbers, antioxidants, aging inhibitors, singlet oxygen quenchers, superoxide anion quenchers, ozone quenchers, visible ray absorbers, and infrared absorbers.

Also, an antistatic agent, polarity-imparting agent, thixotropic agent, antifoamer, etc. may be added, according to need, to each layer to improve the functions thereof.

Next, the constitution of the color-change laminate according to the present invention and its changes in a dry (no liquid absorption) state and upon absorption of a liquid medium, e.g., water will be described.

As described above, in the color-change laminate according to the present invention, the porous layer formed on the substrate and containing a low-refractive-index pigment and a binder resin shows hiding properties in a dry state and thus shields the underlying layer. Upon absorption of water, etc., the porous layer becomes transparent or translucent to develop the underlying layer. By partly moistening the porous layer by using a paint brush, brush, pen, stamp, etc., the moistened part becomes transparent or translucent and hence the color tone of the underlying layer is perceived, even if the substrate has a single color. Thus, the desired image can be developed.

After the porous layer becomes dry due to the vaporization of water, the porous layer shields the underlying layer again and thus recovers the original state.

Because of containing wet-process finely particulate silicic acid, the porous layer has a strong hiding power in a dry state and thus can completely shield the color tone of the underlying layer. Therefore, a laminate with a relatively light color tone can be obtained even though the underlying layer has a dark color. Accordingly, it is possible not only to shield the substrate bearing a pattern or a colorful pattern with the porous layer but also to form on the porous layer a pattern which relates to or unites with a pattern perceived when the porous layer becomes transparent due to liquid absorption, thus giving a visual image of the united patterns upon liquid absorption.

It is also possible to form a pattern with the use of the porous layer colored by adding a general pigment, etc. It is furthermore possible to design the color tone of the porous layer so that it cannot be visually distinguished due to the color tone of the substrate which is perceived after the porous layer becomes transparent upon liquid absorption.

Moreover, the porous layer may be formed on a three-dimensional transparent matter serving as the substrate having transparency. In this case, when the porous layer becomes transparent upon liquid absorption, the three-dimensional matter itself can be perceived.

By providing the color-change laminate according to the present invention with a reversibly thermochromic layer, various changes can be achieved depending on combinations of the color changes, color-change-temperatures and color-change-types of the reversibly thermochromic layer.

Examples of the constitutions of the color-change laminate comprising the reversibly thermochromic layer and the above-mentioned porous layer are as follows: (A) the reversibly thermochromic layer being formed on the substrate and the porous layer being further laminated on the reversibly thermochromic layer (the reversibly thermochromic layer itself may serve as the substrate); (B) the porous layer being formed on the substrate and the reversibly thermochromic layer further being laminated on the porous layer; and (C) the porous layer and the reversibly thermochromic layer being not laminated on each other but formed on the substrate side by side. The reversibly thermochromic layer in each of the above constitutions may undergo either of a reversible color change between a colored state and a colorless state and a reversible color change between a colored state (1) and another colored state (2). Also, use may be made of a constitution where a reversibly thermochromic layer undergoing a change from a colored state to a colorless state is formed on the non-color-changing layer to give a visual change from a colored state (1) to another colored state (2).

When the above constitution (A) is brought into contact with a medium, e.g., water having a temperature in the range excluding the color-change-point of the reversibly thermochromic layer, the medium penetrates into the porous layer and hence makes the porous layer transparent. Thus, the color tone of the underlying reversibly thermochromic layer is perceived.

On the other hand, when the constitution is brought into contact with a medium, e.g., water having a temperature in the range including the color-change-point of the reversibly thermochromic layer, the medium penetrates into the porous layer to make the porous layer transparent and, at the same time, to change the color of the underlying reversibly thermochromic layer.

An example of the above constitution is a color-change material having a reversibly thermochromic layer which changes its color in response to the body temperature. This color-change material is brought into contact with a liquid medium, e.g., water having a temperature in the rage excluding the color-change-point of the reversibly thermochromic layer to thereby make the porous layer transparent. Then, the color of the reversibly thermochromic layer can be changed by a hand touch. This color-change material can be made to show a wide variety of color changes, for example, by-using these layers in combination with a non-color-changing layer.

Next, the constitution (B) will be illustrated. To make a liquid medium, e.g., water to penetrate into the porous layer, it is preferred that the reversibly thermochromic layer located thereon is also a layer allowing the penetration of an aqueous medium thereinto.

In the case of the reversibly thermochromic layer which undergoes a reversible change from a colored state to a colorless state and which is in the colored state at ambient temperatures, when a medium, e.g., water having a temperature within a range where the composition undergoes the color change is adhered, the reversibly thermochromic layer becomes colorless and the porous layer becomes transparent. Thus, the color tone of the substrate is perceived.

When the constitution is not brought into contact with a medium, e.g., water but heated or cooled by a hand touch or blowing a hot or cold air, etc., then the reversibly thermochromic layer becomes colorless and the color tone of the porous layer is perceived.

In the case of the reversibly thermochromic layer which undergoes a reversible change from a colored state to a colorless state and which is in the colorless state at ambient temperatures, when a medium, e.g., water having a temperature within a range excluding the color-change point of the reversibly thermochromic layer is adhered, the porous layer becomes transparent and hence the color tone of the substrate is perceived. When a medium having a temperature within a range where the composition undergoes the color change is adhered, the reversibly thermochromic layer is perceived in the colored state.

The reversibly thermochromic layer in the constitution as described above is preferably one undergoing a reversible change from a colored state to a colorless state.

In the constitution (C), both of the reversibly thermochromic layer and the porous layer are perceived in the ordinary state. In a dry state, the reversibly thermochromic layer alone undergoes a color change with a temperature change. When a medium, e.g., water having a temperature within a range excluding the color-change point of the reversibly thermochromic layer is adhered, the medium penetrates into the porous layer to thereby make it transparent. Thus, the color tone of the substrate is perceived.

When a medium, e.g., water having a temperature within a range including the color-change-point of the reversibly thermochromic layer is adhered, on the other hand, the reversibly thermochromic layer undergoes a color change and, at the same time, the porous layer becomes transparent due to the absorption of the medium. Thus, the color tone of the substrate is perceived.

By disposing these two layers close to each other, in particular, the colors of these layers can be changed by means of either heat or water as described above. Thus, a wider variety of coloring means combined with the resultant increase in the number of colors heighten the suitability of the color-change laminate to toys and designs.

It is also possible to form a reversibly thermochromic porous layer containing a reversibly thermochromic composition and a low-refractive-index pigment. In this constitution, the reversibly thermochromic composition undergoes a reversible change from a colored state to a colorless state. When it is in the colored state at ambient temperatures, a medium having a temperature within a range where the composition undergoes the color change is adhered to the laminate. Thus, the color tone of the substrate is perceived. When the constitution is not brought into contact with a medium but heated or cooled by a hand touch or blowing a hot or cold air, etc., then the reversibly thermochromic composition becomes colorless and the color tone of the low-refractive-index pigment is perceived.

When the reversibly thermochromic composition undergoes reversible color change from a colored state to a colorless state and it is in the colorless state at ambient temperatures, a medium having a temperature within a range where the composition undergoes no color change is adhered to the laminate. Thus, the color tone of the substrate is perceived. When a medium having a temperature within a range where the composition undergoes the color change is adhered to the laminate, the color tone of the thus colored composition is perceived. As the reversibly thermochromic composition in this constitution, it is preferred to use one which undergoes a reversible color change from a colored state to a colorless state.

When a reversibly thermochromic material which changes its color while showing a wide hysteresis width ($\Delta H$) in temperature-color density with changing temperature is employed as the reversibly thermochromic layer, the color change state of the reversibly thermochromic material can be maintained within a specific temperature range. In this case, therefore, the color change state attributable to the reversibly thermochromic material of the color-change laminate according to the present invention can be maintained in the specific temperature range, thus giving a wider variety of design changes.

In the above-mentioned laminate structure, the porous layer may be a patterned layer bearing letters, symbols, figures, etc., if desired. It is also possible to insert a reversibly thermochromic layer or a non-color-changing layer or to form these layers thereon. These layers may bear letters, symbols, figures, etc. too.

The color-change laminate of the present invention can be combined with a doll or a toy animal to give a toy set.

More specifically, an arbitrary part of the doll or animal in water absorption state is pressed against the color-change laminate. As a result, water is allowed to penetrate into the porous layer of the contact site and hence a transparent or translucent image can be perceived. After the porous layer becomes dry with the vaporization of water, the porous layer recovers the original state and thus the image becomes invisible. As the medium for making the color-change laminate to absorb water, it is appropriate to use water from the viewpoints of convenience, safety and cost. However, it is also possible to blend water with a trace amount of water-soluble organic solvents such as propylene glycol so that the drying speed is controlled and the visual image can be perceived over a prolonged period of time.

Examples of the above-mentioned doll or toy animal include dolls for taking the handprint or footprint, toy animals in the shape of bear, horse, cat, dog, flog, crocodile, penguin, etc. for taking the handprint or footprint, toys in the shape of snake, etc. for tracing and toys in the shape of fish, etc. for printing.

Moreover, these dolls may be hand glove puppets or those having mobile hands or head.

These dolls and toy animals may have either the whole figure or a part of the same.

Although these dolls or toy animals may be molded ones made of resins such as flexible vinyl chloride, it is preferred to use stuffed toy animals or dolls which can easily absorb water. It is appropriate to use clothes easily absorbing water, e.g., woven fabrics, knit fabrics, flocked fabrics, raised fabrics, pile fabrics, etc. as the covering of the stuffed toys.

As the stuffings for these toys, it is suitable to use elastic materials such as cotton, clothes, feathers, sponges, etc. Specifically, it is preferable to use short-fiber cotton-like materials having a soft texture and high flexibility. Also, use can be made of stuffings made of molded resin particles, styrene foam, etc.

Two or more types of stuffings may be used combinedly. Also, use can be made of stuffings made of different materials together.

When the above-mentioned doll or toy animal is made of a relatively hard material, it is desirable that the substrate of the color-change laminate is made of a material having satisfactory water-resistance, flexibility or elasticity (e.g., cloth, closed-cell foam, etc.) by which the pressure due to the contact with the toy can be flexibly received and a vivid image can be developed upon water penetration.

Even though the substrate is made of a less elastic material such as a synthetic paper, a vivid image can be developed by forming a flexible or elastic layer between the substrate and the porous layer or under the substrate.

To print an arbitrary part of the doll or toy animal on the above-mentioned color-change laminate, the toy should absorb water.

The term "being in a water absorption state" means either water has been penetrated into the center of the toy or exclusively in the surface layer, or water has been merely adhered to the surface of the toy.

The doll or toy animal may be made in the water absorption state by the following methods. Namely, a container having water therein is located close to or in contact with an arbitrary part of the toy and then water is introduced thereinto to establish the water absorption state. Alternatively, the doll or toy animal is dipped at the arbitrary part in water in a container to make the water absorption state.

The methods comprising locating a container having water therein close to or in contact with an arbitrary part of the toy and then introducing water from the container to the toy to make the toy in the water absorption state include: a method which comprises introducing water in a container, then boring a hole in the container wall, and shaking the container to thereby sprinkle the water passing through the hole over an arbitrary part of the doll or toy animal; another method which comprises introducing water into a container, providing the container with a fibrous member or a brush for bringing out the water and then applying the water to an arbitrary part of the toy; another method which comprises introducing water into a container, providing the container with a sprayer and then spraying the water to an arbitrary part of the toy; and another method which comprises applying pressure onto water in a container as done in a hypodermic syringe and then spraying the water to an arbitrary part of the toy. On the other hand, in the constitution for dipping the doll or toy animal at the arbitrary part in water in a container, use may be made of a method which comprises packing a container with water and a water-absorbent such as sponge to give a constitution like an ink pad and then pressing the toy onto the water-absorbent.

As an example of the above-mentioned toy set, moreover, citation may be made of a toy set consisting of the color-change laminate as described above with a means of water adhesion such as a water pistol.

An appropriate example of the color-change laminate serving as the target is one which comprises a highly water-resistant cloth, synthetic leather or plastic as a substrate. When a cloth is used as the substrate, a woven fabric having highly smooth surface is preferred therefor from the viewpoint of the porous layer film-formation.

When used as the substrate, a cloth absorbs supersaturation water adhering thereto and thus water draining can be relieved or prevented, as compared to the non-porous substrate such as plastic film. Consequently, it is possible to obtain a target clearly showing the water adhesion part.

The cloth provided with the porous layer can be used as the target per se. Alternatively, it may be cut into appropriate shapes and sewed to give targets in the form of hats or dresses. It may be adhered or stitched to various articles.

When the porous layer shows poor film-forming properties due to the less smooth cloth surface or excessive penetration of an ink, etc. into the cloth, the film-forming properties of the porous layer can be improved by, for example, making the cloth water-repellent.

As the means of water adhesion, it is suitable to use a water pistol which jets water. Also, it is possible to sprinkle water with the use of a hose or shower connected to a water pipe; to sprinkle water with the use of a hose or shower connected to a pressure type water tank; to spray water by using a sprayer; to throw a water-absorbent such as a sponge, a water-containing soft gel, an ice piece or a snow ball; to throw or discharge from a model gun a water-containing capsule broken upon a shock; or to pour water with hands.

The color-change laminates of the present invention are effective in a variety of forms including linear shapes, rugged shapes, and three-dimensional shapes, as well as flat shapes.

Specific examples of embodiments of the color-change laminates include stuffed toy animals, dolls, doll clothes such as raincoats, doll accessories such as umbrella and bags, toys such as water pistol targets, models of motor vehicles or ships, and boards on which traces appear, such as, e.g., the handprint or footprint of a man or doll, training materials or stationary such as papers or sheets for writing with water, clothes such as dresses, swimsuits, and raincoats, footwear such as rain boots, prints such as waterproof books and calendars, amusement goods such as stamp cards, puzzles, and various games, swimming or diving goods such as wetsuits, tubes, and float boards, kitchen goods such as coasters and cups, and other articles including umbrella, artificial flowers and winning lottery tickets.

The color-change laminates of the present invention can be applied also to various indicators, for example, for the liquid leakage detection for pipings, water tanks, and other tanks, the detection of wetting by water for the transportation of water-prohibitive chemicals or in storage places therefor, the detection of dew condensation, rainfall, etc., urine detection in disposable diapers, the detection of liquid level or water depth in various containers and pools, and the detection of water in soils.

Examples are given below. All parts in the Examples are by weight.

EXAMPLE 1

(See FIG. 1)

As a substrate 2, use was made of a white nylon taffeta fabric. A fluorescent pink screen printing ink prepared by stirring and homogenizing a mixture of 10 parts of a fluorescent pink pigment (trade name, Epocolor EP-10; manufactured by Nippon Shokubai Kogyo Co., Ltd.), 50 parts of an aqueous acrylic ester emulsion resin (solid content 50%), 0.2 part of a silicone antifoamer, 5 parts of a thickener, 1 part of a leveling agent, 10 parts of water, and 2.5 parts of an epoxy crosslinking agent was used to conduct solid printing on the whole surface of the substrate 2 through a 150-mesh screen stencil. The ink applied was dried and cured at 130° C. for 5 minutes to form a non-color-changing layer 4.

Next, a white screen printing ink prepared by stirring and homogenizing a mixture of 15 parts of a wet-process finely particulate silicic acid (trade name, Nipsil E-200A; manufactured by Nippon Silica Industrial Co., Ltd.) as a low-refractive-index pigment, 50 parts of a water-based urethane resin (trade name, Hydran AP-10, solid content 50%, polyester urethane resin, solid content 30%; manufactured by Dainippon Ink & Chemicals, Inc.) as a binder resin, 30 parts of water, 0.5 part of a silicone antifoamer, 3 parts of a thickener for water-based inks, 1 part of ethylene glycol, and 2 parts of a block isocyanate crosslinking agent was used to conduct solid printing on the whole surface of the above-mentioned non-changing layer 4 through a 180-mesh screen stencil. The ink applied was dried and cured at 130° C. for 5 minutes to form a porous layer 3 which was in a white color in a dry state, thus giving a color-change laminate 1.

The color-change laminate 1 was white in a dry state and sufficiently shielded the underlying layer. When moistened with water, it showed a high transparency and hence the fluorescent pink color was vividly perceived.

When the thus moistened color-change laminate 1 was allowed to stand at room temperature, the fluorescent pink color gradually turned into color with water vaporization. It recovered the original state upon completion of drying.

EXAMPLE 2

A color-change laminate was obtained in the same manner as the one described in EXAMPLE 1 but using a wet-process finely particulate silicic acid (trade name, Nipsil E-74P; manufactured by Nippon Silica Industrial Co., Ltd.) as the low-refractive-index pigment in the white screen printing ink in the formation of the porous layer.

Similar to the product of EXAMPLE 1, this color-change laminate was white in a dry state and sufficiently shielded the underlying layer. When moistened with water, it showed a high transparency and hence the fluorescent pink color was vividly perceived.

EXAMPLE 3

A color-change laminate was obtained in the same manner as the one described in EXAMPLE 1 but using 25 parts of a water-based urethane resin (trade name, Hydran AP-10; manufactured by Dainippon Ink & Chemicals, Inc.) and 15 parts of an aqueous acrylic ester emulsion resin (solid content 50%) as the binder resins in the white screen printing ink in the formation of the porous layer and adjusting the amount of water to 40 parts.

Similar to the product of EXAMPLE 1, this color-change laminate was white in a dry state and sufficiently shielded the underlying layer. When moistened with water, it showed a high transparency and hence the fluorescent pink color was vividly perceived.

EXAMPLE 4

A color-change laminate was obtained in the same manner as the one described in EXAMPLE 1 but using 15 parts of a water-based urethane resin (trade name, Hydran AP-10; manufactured by Dainippon Ink & Chemicals, Inc.) and 21 parts of an aqueous acrylic ester emulsion resin (solid content 50%) as the binder resins in the white screen printing ink in the formation of the porous layer and adjusting the amount of water to 44 parts.

Similar to the product of EXAMPLE 1, this color-change laminate was white in a dry state and sufficiently shielded the underlying layer. When moistened with water, it showed a high transparency and hence the fluorescent pink color was vividly perceived.

EXAMPLE 5

As a substrate, use was made of a white polyester satin fabric. Fluorescent screen printing inks of yellow, pink, green, purple and red in color were used to conduct screen printing on the surface of the substrate to form a non-color-changing layer bearing a flower pattern.

Next, a white screen printing ink prepared by stirring and homogenizing a mixture of 15 parts of a wet-process finely particulate silicic acid (trade name, Nipsil E-74P; manufactured by Nippon Silica Industrial Co., Ltd.) as a low-refractive-index pigment, 37.5 parts of a water-based urethane resin (trade name, Neotan UE-1300, polycarbonate urethane resin, solid content 40%; manufactured by Toagosei Chemical Industry Co., Ltd.) as a binder resin, 42.5 parts of water, 0.5 part of a silicone antifoamer, 3 parts of a thickener for water-based inks, 1 part of ethylene glycol, and 2 parts of a block isocyanate crosslinking agent was used to conduct solid printing on the whole surface of the above-mentioned non-color-changing layer through a 180-mesh screen stencil. The ink applied was dried and cured at 130° C. for 5 minutes to form a porous layer which was in a white color in a dry state, thus giving a color-change laminate.

In this color-change laminate, the white porous layer was perceived in a dry state. When water was adhered thereto, the porous layer became transparent and hence the flower pattern on the substrate was vividly perceived. The porous layer became opaque with water vaporization. It recovered the original white color upon completion of drying and hence the flower pattern on the substrate was shielded again.

Figure 2:
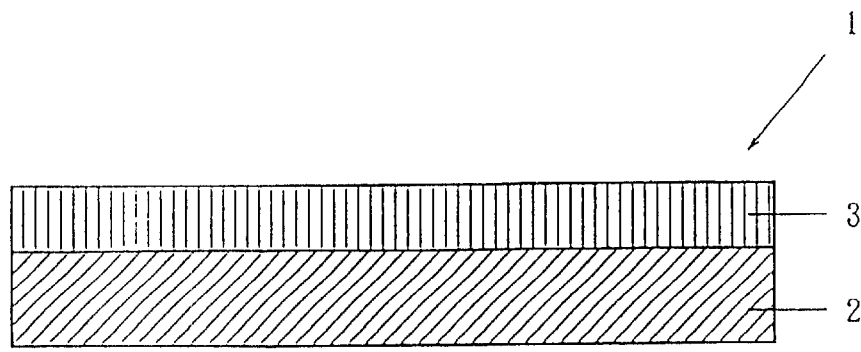
FIG. 2 is a vertical sectional view illustrating another embodiment of the color-change laminates of the present invention.

EXAMPLE 6
(See FIG. 2)

As a substrate 2, use was made of a blue-colored polyester sheet (sheet thickness: 50 μm). A pink screen printing ink prepared by stirring and homogenizing a mixture of 15 parts of a wet-process finely particulate silicic acid (trade name, Nipsil E-1011; manufactured by Nippon Silica Industrial Co., Ltd.) as a low-refractive-index pigment, 50 parts of a water-based urethane resin (trade name, Permarin UA-150, polyether urethane resin, solid content 30%, manufactured by Sanyo Chemical Industries, Ltd.) as a binder resin, 1 part of a water-based pink pigment dispersion (trade name TC Rubin FR-H, pigment content 26–31%;, manufactured by Dainichiseika Colour & Chemicals Mfg. Co., Ltd.), 30 parts of water, 0.5 part of a silicone antifoamer, 3 parts of a thickener for water-based inks, 1 part of ethylene glycol, and 2 parts of a block isocyanate crosslinking agent was used to conduct solid printing on the whole surface of the above-mentioned substrate through a 180-mesh screen stencil. The ink applied was dried and cured at 130° C. for 5 minutes to form a porous layer 3 which was in a pink color in a dry state, thus giving a color-change laminate 1.

The color-change laminate 1 showed the pink color of the porous layer in a dry state. When water was adhered thereto, the porous layer 3 became transparent upon moistening and the vivid purple color formed by mixing the blue color of the substrate 2 with the pink color of the porous layer 3 was perceived. When the thus moistened color-change laminate 1 was allowed to stand at room temperature, it underwent a change from purple gradually into pink with water vaporization. It recovered the original pink color upon completion of drying.

As the result of the following abrasion resistance test with the use of an abrasion test machine, this color-change laminate 1 showed no deterioration in the film after repeating the abrading operation 10 times both in a dry state and upon water absorption.

Figure 3:
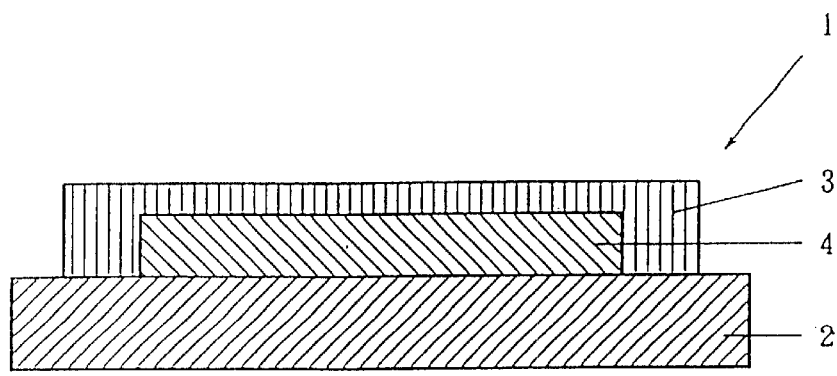
FIG. 3 is a vertical sectional view illustrating still another embodiment of the color-change laminates of the present invention.

EXAMPLE 7
(See FIG. 3)

As a substrate 2, use was made of the hood of a white miniature car produced by injection-molding an ABS resin. The alphabet character "A" was marked thereon by spraying a green oily paint for ABS resins to thereby form a non-color-changing layer 4.

A white water-based spray paint prepared by stirring and homogenizing a mixture of 15 parts of a wet-process finely particulate silicic acid (trade name, Nipsil E-1011; manufactured by Nippon Silica Industrial Co., Ltd.) as a low-refractive-index pigment, 50 parts of a water-based urethane resin (trade name, Permarin UA-150, polyether urethane resin, solid content 30%, manufactured by Sanyo Chemical Industries, Ltd.) as a binder resin, 30 parts of water, 0.5 part of a silicone antifoamer, and 2 parts of a block isocyanate crosslinking agent was used to conduct spray coating on the non-color-changing layer 4 to thereby form a porous layer 3. Further, the coating was dried and cured at 70° C. for 30 minutes to give a color-change laminate 1 in the shape of the miniature car.

This miniature car was in a white color as the whole in a dry state. When water was adhered to the hood, the porous layer 3 became transparent upon moistening and thus the character "A" in a green color was vividly perceived. When the miniature car was allowed to stand at room temperature, the character "A" on the hood underwent a change from green gradually into white with water vaporization. It recovered the original white color upon completion of drying.

Figure 4:
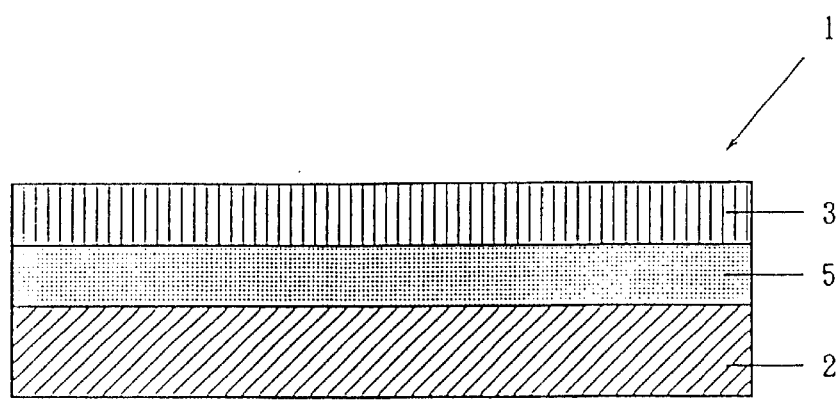
FIG. 4 is a vertical sectional view illustrating a further embodiment of the color-change laminates of the present invention.

EXAMPLE 8
(See FIG. 4)

As a substrate 2, use was made of a white polyester taffeta fabric. A reversibly thermochromic screen ink (red ←→ pink; red at 15° C. and lower, pink at 30° C. and higher) prepared by stirring and homogenizing a mixture of 10 parts of a microencapsulated pigment containing thermochromic color-memory composition (orange ←→ colorless; orange at 15° C. and lower, colorless at 30° C. and higher) 1 part of a fluorescent pink pigment (trade name, Epocolor EP-10; manufactured by Nippon Shokubai Kogyo Co., Ltd.), 10 parts of an aqueous acrylic ester emulsion resin (solid content 50%), 0.2 part of a silicone antifoamer, 1 part of water, 0.5 part of ethylene glycol, 0.5 part of a thickener, and 0.5 part of an isocyanate crosslinking agent was used to conduct solid printing on the whole surface of the substrate 2 through a 109-mesh screen stencil. The ink applied was dried and cured at 130° C. for 5 minutes to form a reversibly thermochromic layer 5.

When the reversibly thermochromic layer 5 was cooled to 15° C. or lower, the red color was perceived. This color tone was maintained in a temperature range below 30° C. Upon heating to 30° C. or higher, it turned into pink and this color tone was maintained in a temperature range exceeding 15° C.

Next, a white screen printing ink for forming a porous layer as prepared in EXAMPLE 1 was used to conduct solid printing on the whole surface of the above-mentioned reversibly thermochromic layer 5 through a 180-mesh screen stencil. The ink applied was dried and cured at 130° C. for 5 minutes to form a porous layer 3 which was in a white color in a dry state, thus giving a color-change laminate 1.

When water or a water-soluble liquid was adhered, the porous layer 3 underwent a change from the white state into a colorless and transparent state.

The above-mentioned color-change laminate 1 was in a white color in a dry state and remained white after cooling or heating. When cold water at 15° C. or lower was adhered, however, the porous layer 3 became transparent due to the water adhesion and thus the color-change laminate underwent an immediate change into the red color attributable to the underlying reversibly thermochromic layer 5. When this color-change laminate 1 in the red color was allowed to stand at room temperature (24° C.), it showed a red color in water absorption state. With water vaporization, it underwent a gradual change from red to white and recovered the original white color upon completion of drying.

Next, warm water at 30° C. or higher was adhered to the color-change laminate 1. Then the porous layer 3 became transparent due to the water adhesion and the reversibly thermochromic layer 5 turned from red into fluorescent pink. Thus, the fluorescent pink color was perceived.

When this color-change laminate 1 was allowed to stand at room temperature (24° C.) in the water adhesion state, it showed the fluorescent pink color. With water vaporization, it underwent a gradual change from fluorescent pink to white and recovered the original white color upon completion of drying.

Next, cold water at 15° C. or lower was adhered to the color-change laminate 1 to thereby change the color-change laminate 1 into red. Then warm water at 30° C. or higher was adhered to a part of the color-change laminate 1. Thus, the part underwent a change from red into pink and this state of the coexistence of the red and pink colors was maintained until water was evaporated to-dryness.

As demonstrated above, this color-change laminate 1 could be changed from the wholly white appearance to the red or fluorescent pink color by adhering cold water or warm water. Moreover, it could recover the original white state, thus showing a variety of color changes. These changes could be repeatedly reproduced without deteriorating the porous layer film.

Figure 5:
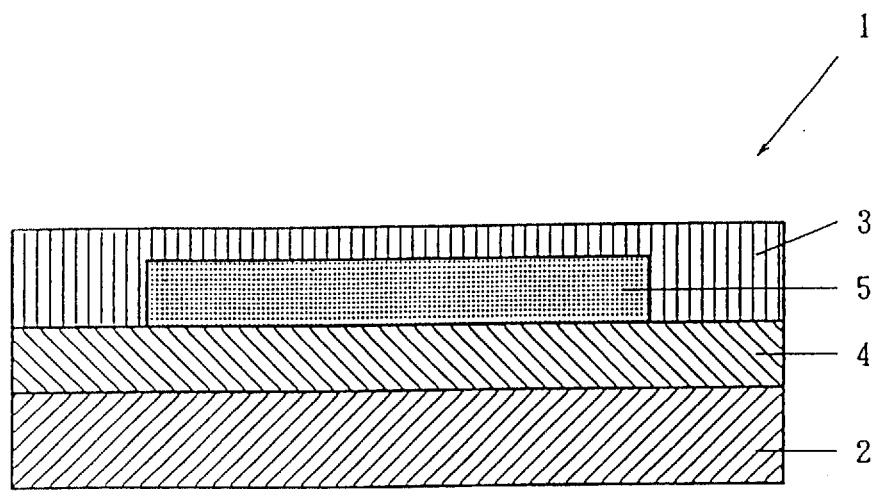
FIG. 5 is a vertical sectional view illustrating still a further embodiment of the color-change laminates of the present invention.

EXAMPLE 9
(See FIG. 5)

As a substrate 2, use was made of a white polyester satin fabric. A fluorescent yellow screen printing ink prepared by stirring and homogenizing a mixture of 10 parts of a fluorescent yellow pigment (trade name, Epocolor EP-117; manufactured by Nippon Shokubai Kogyo Co., Ltd.), 50 parts of an aqueous acrylic ester emulsion resin (solid content 50%), 0.2 part of a silicone antifoamer, 5 parts of a thickener, 1 part of a leveling agent, 10 parts of water, and 2.5 parts of an epoxy crosslinking agent was used to conduct solid printing on the whole surface of the substrate 2 through a 150-mesh screen stencil. The ink applied was dried and cured at 130° C. for 5 minutes to form a non-color-changing layer 4.

Next, a reversibly thermochromic screen ink prepared by stirring and homogenizing a mixture of 10 parts of a microencapsulated reversibly thermochromic composition (pink ←→ colorless; pink at lower than 15° C., colorless at 15° C. and higher), 10 parts of an aqueous acrylic ester emulsion resin (solid content 50%), 0.2 part of a silicone antifoamer, 1 part of water, 0.5 part of ethylene glycol, 0.5 part of a thickener, and 0.5 part of an isocyanate crosslinking agent was used to print a flower pattern through a 109-mesh screen stencil. The ink applied was dried and cured at 130° C. for 5 minutes to form a reversibly thermochromic layer 5.

This constitution having the non-color-changing layer 4 laminated on the reversibly thermochromic layer 5 was wholly in the fluorescent yellow color attributable to the non-color-changing layer 4 at room temperature of 15° C. or higher. When cooled to a temperature lower than 15° C., the reversibly thermochromic layer turned into pink and thus a red flower pattern was perceived on the yellow background. When it was heated again to a temperature of 15° C. or above, the reversibly thermochromic layer 5 became colorless and the whole constitution turned into fluorescent yellow again.

The white screen printing ink for forming a porous layer prepared in EXAMPLE 1 was used to conduct solid printing on the whole surface of the above reversibly thermochromic layer 5 and the ink applied was dried and cured to form a porous layer 3, thus giving a color-change laminate 1.

Upon adhesion of water or a water-soluble liquid, the porous layer 3 underwent a color change from white to a colorless and transparent state.

In a dry state, the color-change laminate 1 had a white color and it remained white after cooling or heating. When water at 15° C. or higher was adhered, however, the porous layer 3 became transparent and the reversibly thermochromic layer became colorless. Thus, the color-change laminate 1 wholly turned into yellow. When it was allowed to stand at room temperature (24° C.), it was dried and recovered the white color with water vaporization.

Next, cold water at lower than 15° C. was adhered thereto. Then the porous layer 3 became transparent and the reversibly thermochromic layer 5 underwent a change from colorless to pink. Thus a red flower pattern was perceived on the yellow background. When the color-change laminate was allowed to stand at room temperature (24° C.), the reversibly thermochromic layer 5 became colorless when the temperature reached 15° C. or higher. Thus, the color-change laminate became wholly yellow and this state was maintained for a while. However, it recovered the original white color upon completion of drying.

As demonstrated above, this color-change laminate 1 could be changed from the wholly white appearance to the wholly yellow appearance or the appearance bearing the red flower pattern on the yellow background. When dried, it recovered the original white state, thus showing a broad variety of color changes. These changes could be repeatedly reproduced without deteriorating the porous layer film.

Figure 6:
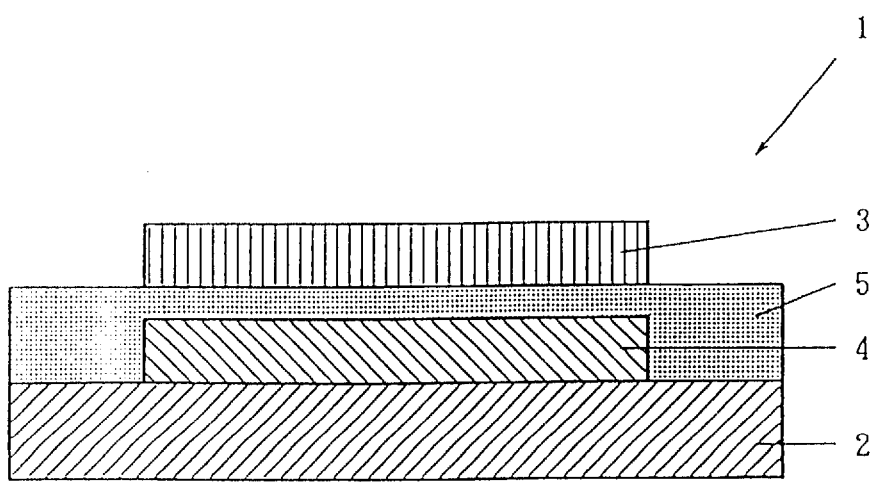
FIG. 6 is a vertical sectional view illustrating another embodiment of the color-change laminates of the present invention.

EXAMPLE 10
(See FIG. 6)

As a substrate 2, use was made of a white synthetic paper. Yellow, pink, purple, green and red fluorescent color inks for synthetic papers were used in screen printing a flower pattern on the substrate to give a non-color-changing layer 4.

Next, a reversibly thermochromic screen ink prepared by stirring and homogenizing a mixture of 10 parts of microencapsulated reversibly thermochromic composition (black ←→ colorless; black at lower than 32° C., colorless at 32° C. and higher), 20 parts of a water-based urethane resin (trade name, Hydran AP-10, polyester urethane resin, solid content 30%; manufactured by Dainippon Ink & Chemicals, Inc.), 0.4 part of a silicone antifoamer, 1 part of water, 0.5 part of ethylene glycol, 1.0 part of a thickener, and. 0.5 part of an isocyanate crosslinking agent was used to conduct solid printing on the whole surface through a 109-mesh screen stencil. The ink applied was dried and cured at 130° C. for 5 minutes to form a reversibly thermochromic layer 5.

This constitution having the non-color-changing layer 4 laminated on the reversibly thermochromic layer 5 was wholly in the black color at room temperature lower than 32° C. When heated to 32° C. or higher, the reversibly thermochromic layer became colorless and the flower pattern attributable to the non-color-changing layer was perceived. When the temperature was lowered again to less than 32° C., the reversibly thermochromic layer turned into black and the flower pattern was shielded.

Next, the white screen printing ink prepared in EXAMPLE 5 was used in printing a butterfly pattern on the reversibly thermochromic layer 5 through a 150-mesh screen stencil to form a porous layer 3 bearing the butterfly pattern, thus giving a color-change laminate 1.

When water or a water-soluble liquid was adhered, the porous layer 3 underwent a change from a white appearance to a colorless and transparent appearance.

This color-change laminate 1 showed a white butterfly pattern attributable to the porous layer 3 on the reversibly thermochromic layer 5 in a black color at room temperature lower than 32° C. When the color-change laminate 1 was heated to 32° C. or higher, the reversibly thermochromic layer 5 turned from black into colorless. Thus, the flower pattern attributable to the non-color-changing layer 4 was developed, thus giving an appearance of the white butterfly pattern on the flower pattern. By cooling it to a temperature lower than 32° C., the appearance of the white butterfly pattern on the black background was perceived again.

When water at a temperature lower than 32° C. was adhered to the above-mentioned color-change laminate 1, the porous layer 3 became transparent and hence the butterfly pattern disappeared, thus giving a wholly black appearance. When it was allowed to stand at room temperature at 24° C., the white butterfly pattern became visible with water vaporization. The white butterfly pattern was perceived on the black background after the completion of drying.

Next, warm water at 32° C. or higher was adhered to the color-change laminate 1. Then the porous layer 3 became transparent and the butterfly pattern thus disappeared. At the same time, the reversibly thermochromic layer 5 turned from black into colorless. As a result, the flower pattern attributable to the non-color-changing layer 4 was exclusively perceived. When it was allowed to stand at room temperature at 24° C., the reversibly thermochromic layer 5 underwent color development after the temperature became lower than 32° C. and thus the flower pattern was shielded by the black color. Although this state was maintained for a while, the white butterfly pattern gradually appeared on the black reversibly thermochromic layer 5 with water vaporization. Upon completion of drying, it recovered the original state of the white butterfly pattern on the black background.

As demonstrated above, this color-change laminate 1 could show four different appearances depending on temperature changes and dipping in warm or cold water: i.e., the appearance bearing the white butterfly pattern on the black background; the wholly black appearance; the appearance of the white butterfly pattern on the colorful flower pattern; and the appearance of the colorful flower pattern alone. These changes in appearance could be reproduced repeatedly without deteriorating the porous layer film.

Comparative Example 1

A color-change laminate was obtained in the same manner as in EXAMPLE 1, except for using a dry-process finely particulate silicic acid (trade name, Aerosil 130; manufactured by Nippon Aerosil Co., Ltd.) as the low-refractive-index pigment in the white screen printing ink for forming the porous layer.

Comparative Example 2

A color-change laminate was obtained in the same manner as in EXAMPLE 1, except for using a dry-process finely particulate silicic acid (trade name, Aerosil OX-50; manufactured by Nippon Aerosil Co., Ltd.) as the low-refractive-index pigment in the white screen printing ink for forming the porous layer.

Comparative Example 3

A color-change laminate was obtained in the same manner as in EXAMPLE 1, except for using 30 parts of an aqueous acrylic ester emulsion resin (solid content 50%) as the binder resin and adjusting the amount of water to 50 parts in the white screen printing ink for forming the porous layer.

Comparative Example 4

A color-change laminate was obtained in the same manner as in EXAMPLE 6, except for using 30 parts of an aqueous acrylic ester emulsion resin (solid content 50%) as the binder resin and adjusting the amount of water to 50 parts in the white screen printing ink for forming the porous layer.

As the result of the following abrasion resistance test with the use of an abrasion test machine, the porous layer in this color-change laminate disappeared after repeatedly abrading 10 times both in a dry state and upon water absorption, thus failing to establish any practically satisfactory film strength.

The following Table 1 summarizes the hiding properties in a dry state and transparencies upon moistening of the color-change laminates of EXAMPLES 1 and 2 and COMPARATIVE EXAMPLES 1 and 2, each evaluated with the naked eye, and the tristimulus values X, Y and Z thereof in the CIE standard calorimetric system.

TABLE 1

| | Performance of porous layer (naked eye) | | Colorimetric data of laminate | | | | | |
|---|---|---|---|---|---|---|---|---|
| | Hiding | Trans- | | | | | | |
| Example | properties | parency | Dry state | | | Liquid absorption | | |
| No. | (dry) | (wet) | X | Y | Z | X | Y | Z |
| Example 1 | ○ | ○ | 66.1 | 70.3 | 83.7 | 26.9 | 49.1 | 46.8 |
| Example 2 | ○ | ○ | 63.7 | 69.0 | 79.3 | 25.5 | 48.4 | 45.3 |
| Comparative Example 1 | Δ | ○ | 59.8 | 65.6 | 78.0 | 28.3 | 48.6 | 49.4 |
| Comparative Example 2 | Δ | ○ | 54.7 | 63.2 | 72.4 | 23.7 | 46.4 | 44.2 |

Evaluation with the naked eye on hiding properties in dry state:
  ○: sufficient hiding properties.
  Δ: no practically usable hiding properties with the perception of the color tone of the underlying layer.
  ×: remarkable perception of the color tone of the underlying layer.

Evaluation with the naked eye on transparency upon moistening with water:
  ○: sufficient transparency.
  Δ: no practically usable transparency with the vague perception of the color tone of the underlying layer.
  ×: remarkable perception of the color tone of the porous layer.

The tristimulus values X, Y and Z were measured by using a colorimeter TC-3600 (manufactured by Tokyo Denshoku K.K.).

As the test results show, the color-change laminates of the present invention were superior to the color-change laminates of the COMPARATIVE EXAMPLES in the hiding properties in a dry state and never deteriorated in the transparency when moistened with water. In the color-change laminates of the present invention, therefore, the color tone of the underlying layer can be sufficiently shielded by the porous layer and, upon water adhesion, the color tone of the underlying layer can be vividly perceived.

The following Table 2 shows the results of the abrasion resistance test on the porous layers of EXAMPLES 1, 3 and 4 and COMPARATIVE EXAMPLE 3 obtained with the use of an abrasion test machine.

TABLE 2

|  | Film durability (abrasion resistance) | |
| --- | --- | --- |
|  | Liquid absorption Dry state after 10 times | Dry state after abrading 10 times |
| Example 1 | ⊚ | ⊚ |
| Example 3 | ○ | ⊚ |
| Example 4 | ○ | ○ |
| Comparative Example 3 | x | x |

Evaluation of abrasion resistance:
  ⊚: no deterioration in film due to abrasion.
  ○: practically usable film strength with slight deterioration in film due to abrasion.
  Δ: no practically usable film strength with serious deterioration in film due to abrasion.
  x: abrasion causing disappearance of the porous layer.

The abrasion resistance test was performed by using an abrasion test machine model 2 (GAKUSHIN type) (manufactured by Suga Shikenki K.K.). An upper abrasion pendulum was provided with a cotton fabric (shirting No. 3, in accordance with JIS L 0803, to be used in JIS color fastness test). After applying a load of 700 g, the pendulum horizontally reciprocated at intervals of 10 cm at a rate of 30 r.p.m. on a color-change laminate sample. (In Table 2, the abrading number means the reciprocation frequency.)

This abrasion resistance test was conducted both in a dry state and upon liquid absorption (i.e., the test samples were moistened with water).

As the test results indicate, the color-change laminates of the present invention were superior in abrasion resistance to the color-change laminate of COMPARATIVE EXAMPLE.

Application Example 1

As a substrate, use was made of a white synthetic paper (280 mm×300 mm, thickness 80 μm). A blue screen printing ink prepared by stirring and homogenizing a mixture of 5 parts of a blue pigment, 50 parts of an acrylic ester emulsion (solid content 50%), 0.2 part of a silicone antifoamer, 3 parts of a thickener, 2 parts of a wetting agent, 1 part of a leveling agent, 10 parts of water, and 2.5 parts of an epoxy crosslinking agent was used to conduct screen printing through a 180-mesh screen stencil in a size of 80 mm×150 mm to form a non-color-changing layer.

Next, a white screen printing ink prepared by stirring and homogenizing a mixture of 15 parts of a wet-process finely particulate silicic acid (trade name, Nipsil E-200A; manufactured by Nippon Silica Industrial Co., Ltd.) as a low-refractive-index pigment, 50 parts of a water-based urethane resin (trade name, Hydran AP-10, polyester urethane resin, solid content 30%; manufactured by Dainippon Ink & Chemicals, Inc.), 30 parts of water, 0.5 part of a silicone antifoamer, 3 parts of a thickener for water-based inks, 1 part of ethylene glycol and 2 parts of an epoxy crosslinking agent was used to conduct solid printing on the whole surface of the above non-color-changing layer to form a porous layer, thus giving a color-change laminate.

A flesh colored woven fabric was used as the covering of a stuffed doll having the shape of a man or an animal. Then it was stuffed with cotton to give a stuffed doll of 200 mm in height having fingers and toes.

Thus, a toy set consisting of the color-change laminate and the doll was obtained.

A urethane foam (diameter 100 mm, thickness 5 mm) employed as a water-absorbent was packed in a round container together with water to give an ink pad.

One hand of the above doll was pressed onto the water-absorbent in the ink pad for about 10 seconds so that water was allowed to penetrate into the covering of the doll. Next, it was pressed onto the porous layer of the above-mentioned color-change laminate for about 3 seconds. Thus, the porous layer absorbed water and became transparent and hence a blue handprint attributable to the underlying non-color-changing layer was obtained.

This handprint was perceived for about 3 minutes at room temperature (24° C.). As the porous layer was drying, it gradually turned into white and recovered the original white state after about 10 minutes with completion of drying.

These changes in appearance could be reproduced repeatedly. Similarly, prints of a variety of shapes could be formed on the color-change laminate by adhering water to various parts of the doll other than hands and then pressing the same onto the color-change laminate.

Application Example 2

As a substrate, use was made of a white polyester taffeta fabric. A green screen printing ink prepared by stirring and homogenizing a mixture of 5 parts of a green pigment (trade name, Sandai Super Green LXB; manufactured by Sanyo Shikiso K.K.), 50 parts of an aqueous acrylic emulsion (trade name, Movinyl 763; manufactured by Hoechst Gosei K.K.), 3 parts of a thickener for water-based inks, 0.5 part of a leveling agent, 0.3 part of an antifoamer and 5 parts of an epoxy crosslinking agent was used to conduct solid printing on the whole surface of the substrate through a 180-mesh screen stencil. The ink applied was dried and cured at 100° C. for 3 minutes to form a non-color-changing layer.

Next, a yellow screen ink prepared by stirring and homogenizing a mixture of 15 parts of a wet-process finely particulate silicic acid (trade name, Nipsil E-220; manufactured by Nippon Silica Industrial Co., Ltd.) as a low-refractive-index pigment, 1 part of a yellow pigment (trade name, Sandai Super Yellow 10GS; manufactured by Sanyo Shikiso K.K.), 45 parts of a urethane resin (trade name, Hydran AP-20, solid content 30%; manufactured by Dainippon Ink & Chemicals, Inc.), 40 parts of water, 0.5 part of a silicone antifoamer, 3 parts of a thickener for water-based inks, 1 part of ethylene glycol and 3 parts of a block isocyanate epoxy crosslinking agent was used to conduct solid printing on the whole surface of the above non-color-changing layer through a 100-mesh screen stencil. The ink applied was dried and cured at 130° C. for 5 minutes to form a porous layer, thus giving a color-change laminate.

The obtained color-change laminate was cut and sewed to form a jacket for children, thus giving a color-changing target.

This color-changing target was combined with a water pistol and used in a survival game. In a dry state, it showed not the green color attributable to the non-color-changing layer but the yellow color attributable to the porous layer.

When water was adhered to the target by using the water pistol, the porous layer in the moistened part became transparent and thus the vivid green color attributable to the underlying layer was perceived.

Since the fabric absorbed water, the water adhering to the target was prevented from running down, which made the target practically useful.

The above constitution was in a green color upon water adhesion and turned into yellow with water vaporization. These changes could be reproduced repeatedly, which enhanced the amusement of the game.

The color-change laminate according to the present invention, which is excellent in hiding properties in a dry state and transparency upon liquid absorption, can undergo remarkable color changes and hence makes it possible to perceive relatively light color tones such as fluorescent colors. These characteristics make it highly applicable in various fields including toys, ornaments, designs, etc.

By combining the color-change laminate with a doll or a toy animal or a means of water adhesion such as a water pistol, a toy set with enhanced amusement can be provided.

While the invention has been described in detail and with reference to specific examples thereof, it will be apparent to one skilled in the art that various changes and modifications can be made therein without departing from the spirit and scope thereof.

What is claimed is:

1. A color-change laminate which comprises a cloth and a porous layer formed thereon, said porous layer comprising (i) a binder resin comprising at least an urethane resin selected from the group consisting of polyester urethane resins, polycarbonate urethane resins, and polyether urethane resins, (ii) a cross-linking agent, and (iii) a finely particular silicic acid produced by a wet process,
    wherein the amount of the binder resin is 0.5 to 2 parts by weight on solid basis per 1 part by weight of the finely particular silicic acid, and wherein said porous layer becomes transparent or translucent upon liquid absorption to give a variety of visual changes.

2. The color-change laminate according to claim 1, wherein the urethane resin is at least 30% by weight on solid basis of the binder resin.

3. The color-change laminate according to claim 1, wherein the finely particular silicic acid has a molecular structure containing two-dimensional structure parts.

4. The color-change laminate according to claim 1, wherein said porous layer contains from 1 to 30 $g/m^2$ of the finely particular silicic acid.

5. The color-change laminate according to claim 1, which further comprises a non-color-changing layer containing a fluorescent colorant provided under said porous layer.

6. A toy set comprising the color-changes laminate according to claim 1 and a toy selected from the group consisting of a doll and a toy animal.

7. A toy set comprising the color-change laminate according to claim 1 and a means for applying water thereto.

* * * * *